United States Patent
Bai et al.

(10) Patent No.: US 8,085,498 B2
(45) Date of Patent: Dec. 27, 2011

(54) PMR WRITE WITH FLUX CHOKING AREA

(75) Inventors: Zhigang Bai, Milpitas, CA (US); Yue Liu, Fremont, CA (US); Kowang Liu, Fremont, CA (US); Yan Wu, Cupertino, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 308 days.

(21) Appl. No.: 12/586,249

(22) Filed: Sep. 17, 2009

(65) Prior Publication Data

US 2011/0063755 A1    Mar. 17, 2011

(51) Int. Cl.
G11B 5/127    (2006.01)
(52) U.S. Cl. .................................. 360/125.03
(58) Field of Classification Search ............. 360/125.03, 360/125.07, 125.06, 125.08, 125.13, 125.31; 29/603.07, 603.15
See application file for complete search history.

(56) References Cited

U.S. PATENT DOCUMENTS

| | | | |
|---|---|---|---|
| 4,858,048 A * | 8/1989 | Hayakawa et al. | 360/121 |
| 7,538,976 B2 | 5/2009 | Hsiao et al. | |
| 2005/0259356 A1 * | 11/2005 | Han et al. | 360/126 |
| 2009/0091862 A1 | 4/2009 | Han et al. | |
| 2010/0061016 A1 * | 3/2010 | Han et al. | 360/125.3 |
| 2011/0086182 A1 * | 4/2011 | Matono et al. | 427/553 |

OTHER PUBLICATIONS

"Return Field-Induced Partial Erasure in Perpendicular Recording Using Trailing-Edge Shielded Writers," by Daniel Z. Bai et al., IEEE Transactions on Magnetics, vol. 43, No. 2, Feb. 2007, pp. 600-604.
Co-pending US Patent HT07-064, U.S. Appl. No. 12/157,683, filed Jun. 12, 2008, "Composite Writer Shield for Improving Writer Performance," assigned to the same assignee as the present invention.

\* cited by examiner

*Primary Examiner* — Allen Cao
(74) *Attorney, Agent, or Firm* — Saile Ackerman LLC; Stephen B. Ackerman (57) ABSTRACT

A PMR writer having a trailing shield structure is disclosed in which a flux choking layer (FCL) formed adjacent to the ABS provides a means to limit the amount of flux flowing from the trailing shield to a first write shield (WS1) near the write pole tip thereby significantly reducing adjacent track erasure. The FCL has a substantially smaller thickness than a top section of the trailing shield to which it is attached along a side opposite the ABS. As a result, pole tip protrusion is reduced compared to prior art PMR writers. The FCL contacts a trailing side of WS1 at the ABS and one or both of the trailing sides of the WS1 and FCL may be tapered or perpendicular with respect to the ABS. The top trailing shield section, FCL, and WS1 may be comprised of NiFe, CoFe, CoFeNi, or alloys thereof.

25 Claims, 5 Drawing Sheets

PMR WRITE WITH FLUX CHOKING AREA

RELATED PATENT APPLICATION

This application is related to the following: Ser. No. 12/157,683, filing date Jun. 12, 2008; which is assigned to a common assignee and is herein incorporated by reference in its entirety.

FIELD OF THE INVENTION

The invention relates to a perpendicular magnetic recording (PMR) write head and a method for making the same. The PMR writer has at least a trailing shield where a front portion thereof proximate to the air bearing surface (ABS) has a smaller thickness than a back portion to minimize pole tip protrusion and choke excessive flux flowing to shield near the write gap thereby reducing adjacent track erasure (ATE).

BACKGROUND OF THE INVENTION

Perpendicular recording has been developed in part to achieve higher recording density than is realized with longitudinal recording devices. A PMR write head typically has a main pole layer with a small surface area at an ABS, and coils that conduct a current and generate a magnetic flux in the main pole that exits through a write pole tip and enters a magnetic media (disk) adjacent to the ABS. The flux may return through a shield structure to the back gap region which connects the main pole with the shield structure. A trailing write shield on the write gap above the main pole and along the ABS is employed in a PMR trailing shield writer and has been used to replace the monopole writer due to its excellent down-track field gradient which provides a better signal-to-noise ratio from the better written transition quality. However, the trailing shield writer has issues which require additional design optimization. For example, there is return field induced partial erasure (RFPE) that is caused by excessive return field near the trailing shield seed layer, mainly on track as described by Bai et al. in "Return field induced partial erasure in perpendicular recording using trailing edge shielded writers", IEEE Trans. Magn., Vol. 43, pp 600-604 (2007). Another concern is that a trailing shield may cause adjacent track erasure (ATE) or wide area track erasure (WATE) which are often related to excessive flux being delivered to the shields on the ABS through the trailing shield (PP3) path.

Perpendicular magnetic recording has become the mainstream technology for disk drive applications beyond 150 Gbit/in². The demand for improved performance drives the need for a higher areal density which in turn calls for a continuous reduction in transducer size. A PMR head which combines the features of a single pole writer and a double layered media (magnetic disk) has a great advantage over LMR in providing higher write field, better read back signal, and potentially much higher areal density. Typically, today's magnetic head consists of a writer and a reader as separate elements that are formed adjacent to one another along an ABS. The read head may be based on a TMR element in which a tunnel barrier layer separates two ferromagnetic (FM) layers where a first FM layer has a fixed magnetization direction and the second FM layer has a magnetic moment that is free to rotate about a direction orthogonal to the direction of the magnetic moment in the reference "fixed" layer. The resistance across the barrier changes as the free layer moment is rotated. This signal is used to detect the small magnetic field from the recorded magnetization pattern on the media.

Reducing the magnetic spacing from read/write heads to the magnetic media during both writing and reading is the most important factor in achieving better performance in high density recording. The writer and reader are separated by several microns in a typical recording head and are made of several different materials each having a unique coefficient of thermal expansion (CTE). Therefore, the protrusion of the reader and writer are usually quite different due to the effect of varying operating temperatures, applying dynamic flying height (DFH) power to actuate the reader or writer, or from write current excitation. The ratio of reader protrusion rate/writer protrusion rate is called the gamma ratio. A low gamma ratio significantly below 1 means the writer protrusion rate is much higher than the reader protrusion rate, and could potentially put a greater limit to achievable reader spacing. Improvements in PMR head design are needed to control the writer protrusion distance.

Figure 1A:
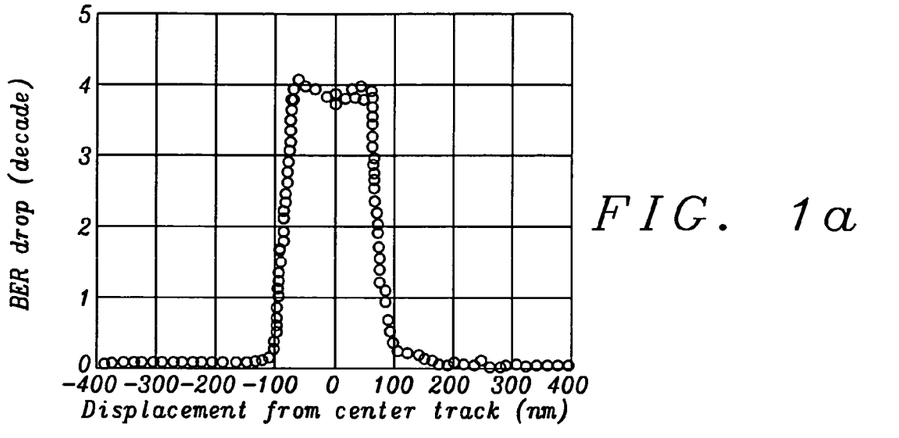
FIGS. 1a,1b are drawings that indicate how ATE in a standard PMR writer (FIG. 1a) becomes greater in a prior art PMR writer with an enlarged back gap region (FIG. 1b).
Figure 1B:
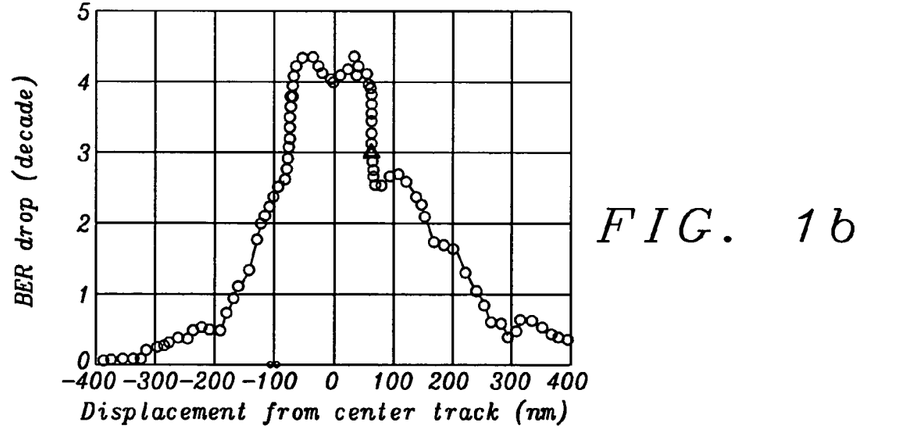

Recent efforts have involved improving the saturation speed of a PMR writer by enlarging the back gap and thus allowing more flux through the larger back gap. Unfortunately, as shown in FIG. 1, the ATE and WATE become significantly worse which is indicated by comparing the ATE of a standard head in the (a) diagram with ATE in a head (b) having an enlarged back gap. An improved head design is needed to take advantage of better saturation speed without compromising ATE performance.

Figure 2A:
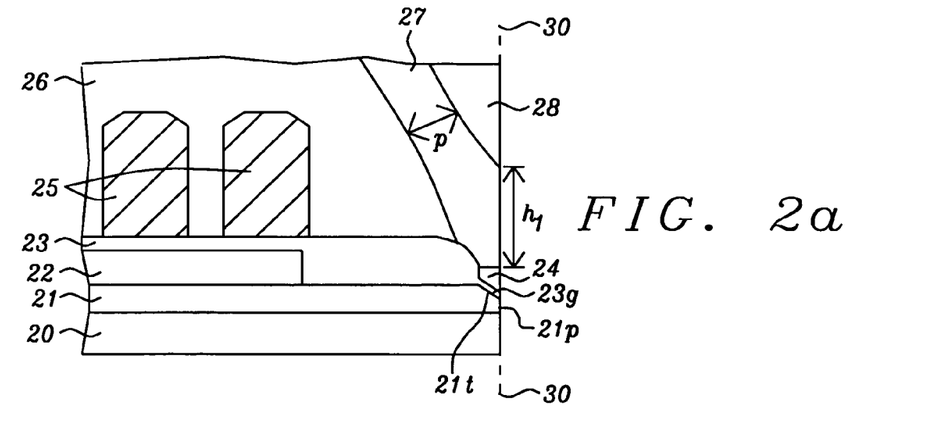
FIGS. 2a,2b are cross-sectional views of prior art PMR writers where trailing shield height at the ABS is determined by ABS lapping (FIG. 2a), and the trailing shield thickness is nearly uniform at the ABS and on the dome shape over the coils (FIG. 2b).
Figure 2B:
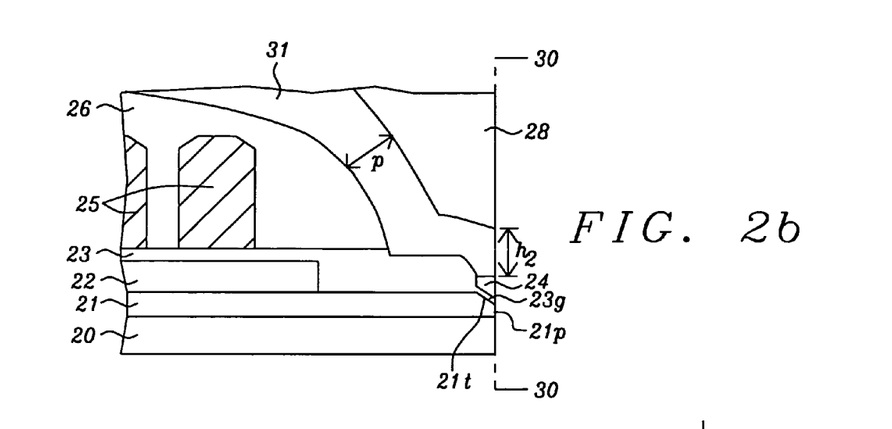

Referring to FIGS. 2a, 2b, two prior art PMR writers are depicted. In FIG. 2a, the PP3 layer 27 has a height h1 at the ABS 30-30 that is defined by the ABS lapping process. PP3 refers to a top portion of the trailing shield that includes the entire portion of the trailing shield formed above a plane that is approximately coplanar with a top surface of the top yoke 22. Therefore, the PP3 thickness h1 at the ABS is much larger than the plated PP3 thickness p in other regions due to the dome shape of the photoresist layer 26 that covers the coils 25. Other layers pictured in the PMR writer are a substrate 20, main pole layer 21 with write pole tip 21p and tapered trailing side 21t, top yoke 22, dielectric layer 23 with write gap 23g, first write shield 24, and overcoat layer 28. Even though the photoresist layer 26 is recessed farther from the ABS 30-30 in FIG. 2b, the thickness h2 of the PP3 layer 27 at the ABS is still equivalent to the plated PP3 thickness p in other regions. As a result, neither configuration is designed to limit the flux flowing from the PP3 trailing shield section to the vicinity of the trailing edge 21t of the main pole during normal writing which means the ATE/WATE performance is not improved.

Another disadvantage of having a large amount of metal in the PP3 layer along the ABS is that the metal serves as a heat sink and leads to a large pole trip protrusion (PTP) which in turn limits the budget for the read/write head spacing from the media and thereby degrades read/write performance.

A search of the prior art revealed the following references that relate to the effect of a trailing write shield design on flux choking.

U.S. Pat. No. 7,538,976 discloses a trailing shield with a specially configured back edge opposite the ABS where a center portion has a constant throat height (TH) while first and second intermediate positions have a greater TH than the center portion. The structure chokes off stray fields that might be picked up by outer portions of the shield to prevent excessive flux from reaching the center portion where it may affect writing.

In U.S. Patent Application No. 2009/0091862, a tapered main pole is described with integrated side and tailing shields to eliminate flux choking at the side and trailing shield interface.

None of the prior art references solve the issue of improved control for pole tip protrusion while simultaneously providing flux choking from the trailing shield which is necessary to meet the performance requirements of advanced PMR writers.

SUMMARY OF THE INVENTION

One objective of the present invention is to provide a PP3 section of a trailing shield structure in a PMR write head that serves to significantly reduce or choke the amount of flux that is produced by the trailing shield at the ABS and thereby minimize ATE and WATE without affecting down-track performance.

Another objective of the present invention is to provide a PP3 section of a trailing shield structure according to the first objective that has reduced volume along the ABS in order to reduce pole tip protrusion in the PMR write head.

According to the present invention, these objectives are achieved in an embodiment wherein a PMR write head has a main pole layer with a write pole including a side (write pole tip) along an ABS and a back end section opposite the write pole tip with respect to the ABS. There is a top yoke formed on the main pole layer and separated from the ABS by a dielectric layer that comprises a write gap along the ABS. The top yoke and dielectric layer are preferably coplanar along a side opposite the main pole layer. The write gap contacts a trailing side of the write pole and separates the write pole from a trailing shield structure. Above the write gap in a down-track direction is a first write shield which in one aspect has a trailing side which is coplanar with the top yoke. A key feature is that a first section of the trailing shield structure is formed along the ABS and contacts a trailing side of the first write shield and a top surface of the dielectric layer. The first section is also known as a flux choking layer and has a first thickness along a first side at the ABS and extends a first distance of 0.1 to 2 microns away from the ABS and towards the back end of the PMR write head. A second side of the flux choking layer opposite the first side abuts the front side of a PP3 section of the trailing shield at the first distance from the ABS and has a first thickness. The PP3 section may have a dome shape that covers one or more insulation layers and a plurality of coils formed within the one or more insulation layers. The PP3 section has a second thickness substantially greater than the first thickness and adjoins the top yoke above a back end of the main pole layer.

In a second embodiment, the write shield of the first embodiment is modified to include a tapered trailing side instead of a trailing side that is formed perpendicular to the ABS. As a result, the flux choking layer which preferably conforms to the trailing side of the first write shield has a tapered side that extends a second distance from the ABS. A portion of the flux choking layer which contacts the dielectric layer retains a planar top surface that is formed perpendicular to the ABS and extends a third distance along the top surface of the dielectric layer from the end of the tapered write shield to the front side of the PP3 section of the trailing shield structure. Preferably, the tapered flux choking portion along the ABS has the same first thickness as the portion on the dielectric layer and the first thickness is substantially less than the thickness of the adjoining PP3 section of the trailing shield structure.

According to a third embodiment, the flux choking layer may have a continuous tapered trailing side that extends from the ABS to the PP3 section of the trailing shield structure. There is a first side of the flux choking layer with a first thickness along the ABS and a second side opposite the ABS where the flux choking layer adjoins the PP3 trailing shield section. The second side has a greater thickness than the first side but a substantially smaller thickness than the adjoining PP3 section. A side opposite the trailing tapered side contacts the write gap and dielectric layer and is formed perpendicular to the ABS.

A method is disclosed for forming a PMR writer according to the first embodiment of the present invention. A substrate is provided on which a main pole layer is formed by a conventional method such as electroplating. Typically, the main pole layer is formed within a dielectric layer that is coplanar with a top surface of the main pole layer. A second dielectric layer is deposited on the main pole layer and first dielectric layer followed by one or more photoresist patterning and etching sequences to form a first opening for the yoke and a second opening for a first write shield. The first and second openings may be filled during an electroplating process and then planarized so that the top surfaces of the yoke, second dielectric layer, and first write shield are coplanar. Thereafter, a flux choking layer is formed on the first write shield and on a portion of the second dielectric layer adjacent to the first write shield by a process comprising formation of a photoresist masking layer, deposition of the flux choking layer, and then lift-off removal of the photoresist mask, or deposition of a full film flux choking layer followed by ion milling to define the flux choking layer section adjacent to the eventual ABS. In a subsequent step, one or more insulation layers are formed on a portion of the top yoke and a portion of the second dielectric layer adjacent to the top yoke. A conventional method is employed to form a plurality of coils within the one or more insulation layers. A photoresist layer is formed over the coils and reflowed to create a dome shape on the top insulation layer. Then a seed layer is deposited on regions of exposed top yoke near the back end of the main pole layer, on the dome shaped insulation layer, on the second dielectric layer adjacent to the flux choking layer, and over the flux choking layer. A photoresist mask is formed above the flux choking layer before the PP3 section of the trailing shield is electroplated on the seed layer. The unwanted seed layer outside the magnetic area is removed by an ion milling step and then the photoresist mask is stripped.

In an alternative embodiment, deposition of the flux choking material is omitted prior to formation of the dome shaped insulation layer covering the plurality of coils and the seed layer serves as the flux choking layer.

DETAILED DESCRIPTION OF THE INVENTION

Figure 3:
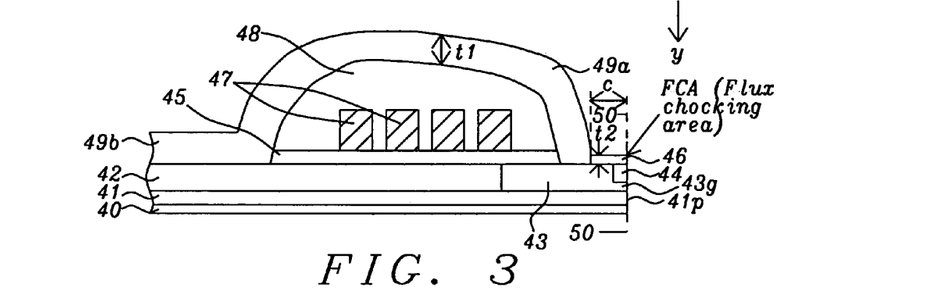
FIG. 3 is a cross-sectional view showing a PMR writer where the trailing shield thickness is less in a flux choking layer near the ABS than in other sections that are a greater distance from the ABS according to one embodiment of the present invention.
Figure 12:
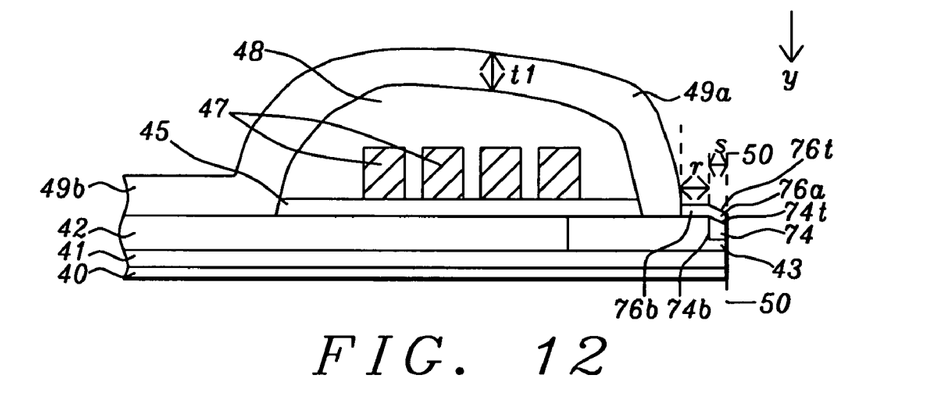
FIG. 12 is a cross-sectional view of a PMR writer having a flux choking layer of a trailing shield formed on a tapered edge of a first write shield adjacent to the ABS according to a second embodiment of the present invention.
Figure 13:
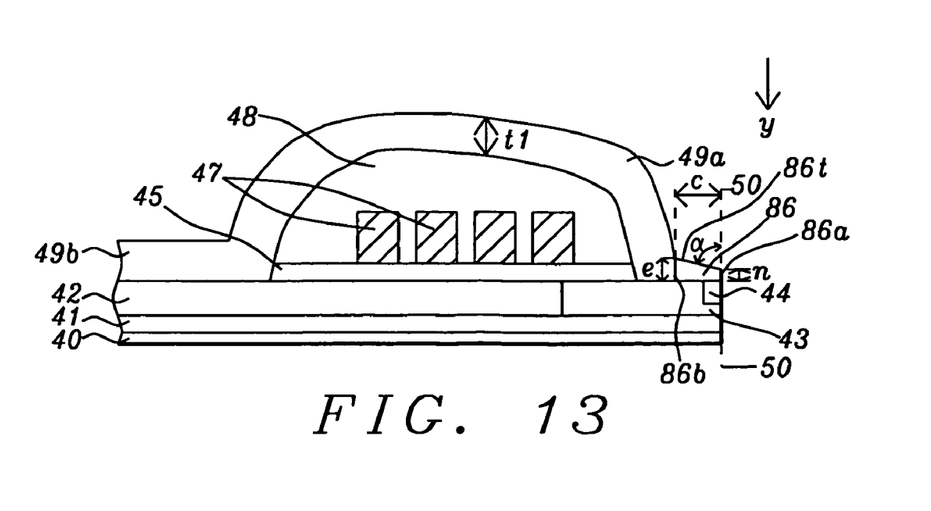
FIG. 13 is a cross-sectional view of a PMR writer having a tapered flux choking layer of a trailing shield formed on a first write shield adjacent to the ABS according to a third embodiment of the present invention.

The present invention relates to a PMR write head, and in particular, to the shield structure that includes at least a trailing shield but may also incorporate side shields and a leading shield. The various embodiments represented by FIG. 3, FIG. 12, and FIG. 13 depict a PMR writer with only a trailing shield structure in order to simplify the drawings and point out the key features of the invention. The PP3 section of the trailing shield is the portion of the trailing shield structure that is formed above a plane that is essentially coplanar with the top surface of the top yoke in the exemplary embodiments. It should be understood that the PP3 section may have a shape other than a dome shape as explained in related patent application Ser. No. 12/157,683. Furthermore, the present invention encompasses a bottom yoke configuration in addition to the top yoke configuration described herein. A bottom yoke structure is defined as a design where the yoke adjoins a side of the main pole layer opposite the trailing shield structure and not on a side facing the trailing shield. A top surface of a layer is defined as a surface facing away from the substrate while a bottom surface of a layer faces the substrate. Furthermore, the main pole is shown with no tapered side but may include one or both of a leading edge taper and a trailing edge taper according to alternative embodiments of the present invention. Although only a PMR write head is depicted, the PMR writer may be part of a read/write head configuration as appreciated by those skilled in the art.

Referring to FIG. 3, a first embodiment of the present invention is represented in a cross-sectional view as shown from a plane that is perpendicular to an air bearing surface (ABS) 50-50. There is a substrate 40 that may be a separation layer made of $Al_2O_3$ between a read head (not shown) and the PMR write head as described herein. The separation layer may also be a composite comprised of an upper etch stop layer such as Ru and a lower dielectric layer. It should be understood that the substrate 40 may be part of a slider (not shown) formed in an array of sliders on a wafer. After an array of PMR write heads is fabricated to form one writer per slider, the wafer is sliced to form rows of sliders. Each row is typically lapped to afford an ABS before dicing to fabricate individual sliders that are used in a magnetic recording device.

A main pole layer 41 with a write pole tip 41p at the ABS 50-50 is formed on the substrate 40. There is a top yoke 42 formed on a portion of the main pole layer and which is separated from the ABS by a dielectric layer 43. Dielectric layer 43 may be made of alumina and includes a write gap 43g that contacts a trailing edge of the write pole 41p along the ABS. The PMR writer moves in a down-track direction "y" during a write process which means the write pole tip 41p passes over a certain portion of the magnetic media (not shown) before the write gap 43g and first write shield 44 pass over the same location. Thus, the trailing edge of the write pole tip 41p is on a side of the main pole layer 41 which is opposite the substrate 40 and passes over a certain location on a magnetic medium after a leading edge of the write pole tip. Preferably, a top surface of the top yoke 42, a top surface of dielectric layer 43, and a trailing side of a first write shield 44 are coplanar.

A key feature of the first embodiment is a flux choking layer 46 that is formed with a uniform thickness $t_2$ of 0.1 to 0.3 microns on a trailing side of the first write shield 44 and on a section of dielectric layer 43 adjacent to the first write shield. Note that the plane of the flux choking layer 46 in the first embodiment is formed perpendicular to the ABS 50-50. The flux choking layer 46 may be comprised of the same magnetic material such as NiFe, CoFe, CoFeNi, or alloys thereof that is employed in the main pole layer 41, top yoke 42, first write shield 44, and in PP3 sections 49a, 49b of a second write shield. In an alternative embodiment, the flux choking layer 46 may be comprised of a magnetic material that is different than the magnetic material in one or more of the main pole layer 41, top yoke 42, first write shield 44, and PP3 sections 49a, 49b.

The flux choking layer 46 extends a distance of 0.1 to 2 microns from the ABS and terminates along a front side of a PP3 section 49a of a second write shield also referred to as a trailing shield. The second write shield includes a PP3 section 49b that represents a back end where the second write shield is connected to a back end of the main pole layer 41 through the top yoke 42 in a back gap region. Back end refers to a portion of the device that is a greater distance from the ABS than other portions of the PMR write head including the write coils 47. Together, PP3 sections 49a, 49b, flux choking layer 46, and first write shield 44 form an integrated trailing shield. An important feature of the flux choking layer 46 is that the thickness $t_2$ is substantially less than the thickness $t_1$=0.3 to 1.0 microns of PP3 sections 49a, 49b in order to restrict the amount of flux flowing from the second write shield into the first write shield 44 in the vicinity of the write pole tip 41p. As a result of the lower field exerted by the integrated trailing shield proximate to the write pole tip 41p, there is significantly less ATE and WATE than in conventional PMR write heads. Furthermore, because of the lower volume of trailing shield metal proximate to the ABS than in prior art designs due to the thin flux choking layer, pole tip protrusion is significantly reduced.

It should be understood that magnetic alloys have a higher CTE than dielectric layers and insulation materials used in a PMR writer. Therefore, for a certain temperature increase in a write head, a relatively low volume of trailing shield proximate to the ABS will cause less thermal expansion than in conventional writers and help to control movement (PTP) of the write pole tip 41p toward the magnetic media.

The PMR writer illustrated in FIG. 3 also has a first insulation layer 45 formed on the top yoke 42 and on a portion of dielectric layer 43 between the front PP3 section 49a and back PP3 section 49b. In one embodiment, the PP3 section 49a has a dome shape where a top curved surface 49s faces away from the main pole layer 41. PP3 section 49a covers a second insulation layer 48 formed on first insulation layer 45 in which a plurality of coils 47 are formed. Second insulation layer 48 may be comprised of a photoresist that has been heated to a reflow temperature to form the dome shape. The first insulation layer 45 is typically made of a dielectric layer such as alumina that serves as an etch stop during a reactive ion etch that forms openings in an overlying photoresist (not shown) in which the coils 47 are plated.

Figure 4A:
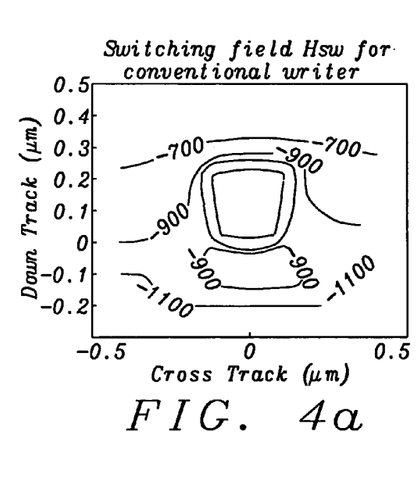
FIG. 4b is a plot that shows how the switching field Hsw for the PMR writer in FIG. 3 has a significantly reduced negative field compared with that of a standard PMR writer shown in the FIG. 4a plot.
Figure 4B:
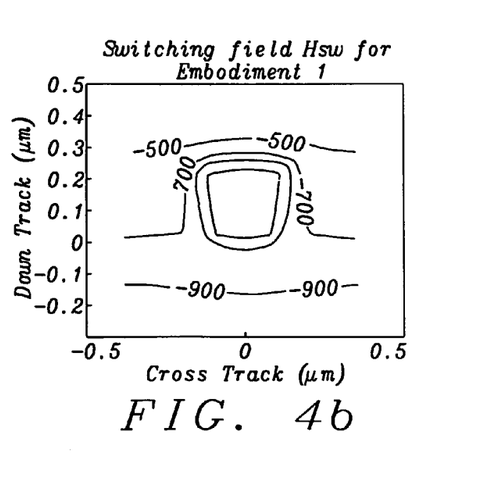

Referring to FIG. 4a, switching field Hsw is shown for a conventional writer where the thickness of a PP3 section of a trailing write shield at the ABS is the same or greater than that in a section over the coils or at the back end. The results are from FEM modeling of a four sided shielded pole writer including two side shields, a trailing shield, and leading shield. A similar field contour plot in FIG. 4b for a PMR writer according to the first embodiment of the present invention indicates a substantially lower negative field. Typically, the Hsw field is reduced by about 200 Oe or around 18% to 28% in magnitude by incorporating a flux choking layer in the trailing shield structure.

Figure 5A:
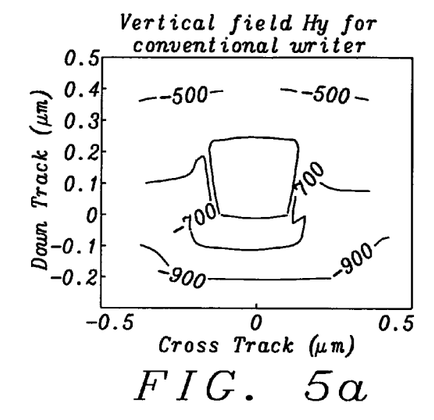
FIG. 5b is a plot that shows how the vertical field Hy for the PMR writer in FIG. 3 has a significantly reduced negative field compared with that of a standard PMR writer shown in the FIG. 5a plot.
Figure 5B:
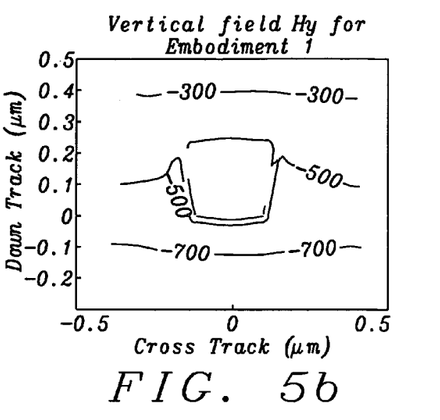

Referring to FIG. 5a, vertical field Hy is shown for a conventional writer where the thickness of a PP3 section of a trailing write shield at the ABS is the same or greater than that in a section over the coils or at the back end. Again, FEM modeling of a four sided shielded pole writer was used to generate the contour plot. A similar field contour plot in FIG. 5b for a PMR writer according to the first embodiment of the present invention indicates a substantially lower negative field where Hy is lowered by about 200 Oe which is equivalent to a reduction in field magnitude of 22% to 40%.

Figure 6:
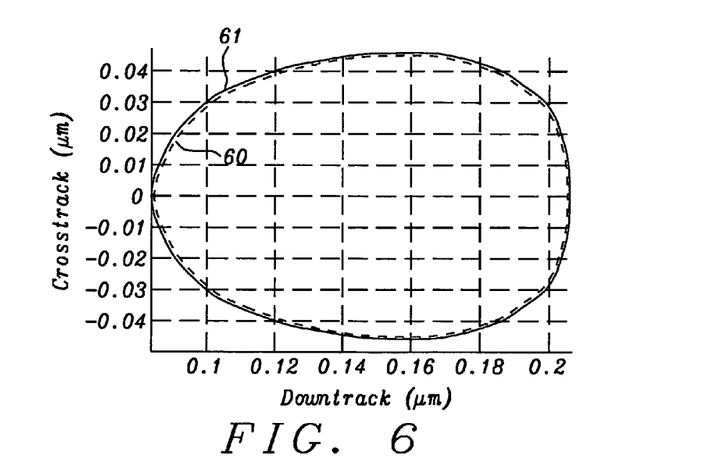
FIG. 6 is a field contour plot at Hy=5000 Oe which indicates no difference between a prior art PMR writer and a PMR writer formed according to the present invention.

Referring to FIG. 6, a field contour plot of vertical field Hy=5000 Oe is illustrated for a prior art PMR writer with a conventional PP3 trailing shield structure (dashed curve 60) and for a PMR writer according to the first embodiment (curve 61) and indicates no significant difference in main pole layer writing profile. For reference, the plot in FIG. 6 is generated from a small center portion of the plot in FIGS. 5a, 5b where cross-track and down-track positions are equal to 0 microns. Table 1 summarizes the maximum fields, field gradient, and erase width (EW) from the FEM modeling results and shows no on-track performance degradation for a PMR write head according to the present invention compared with a prior art process of record (POR) writer. The term "dx" refers to a change in the down-track position in nm units.

TABLE 1

Comparison of magnetic properties for PP3 shield designs

| Row | PP3 design | Hy_max (Oe) | Hsw_max (Oe) | EW (nm) | dHsw/dx @8K Oe (Oe/nm) |
|---|---|---|---|---|---|
| 1 | POR | 8804 | 14376 | 89 | 359 |
| 2 | With flux choking layer | 8863 | 14432 | 90 | 359 |

Referring to FIG. 12, a second embodiment of the present invention is depicted that represents a modification of the PMR writer structure shown in FIG. 3. In particular, the planar first write shield 44 having a trailing side aligned perpendicular to the ABS 50-50 in the first embodiment is replaced by a first write shield 74 that has a tapered trailing side 74t. Therefore, a side of the tapered first write shield along the ABS has a smaller thickness in the "y" direction than a side 74b opposite the ABS. The tapered trailing side may be formed by an ion beam etch as appreciated by those skilled in the art. In addition, the flux choking layer 46 in the first embodiment is replaced by a non-planar flux choking layer comprised of two sections. A front section 76a along the ABS contacts the tapered trailing side 74t and extends a distance s of about 0.05 to 0.3 microns from the ABS. A back section 76b formed on dielectric layer 43 contacts a back side of the front section 76a and extends a distance r to a front side of the front PP3 section 49a. In one embodiment, r+s=c where c is 0.3 to 2 microns. Other layers depicted in FIG. 12 remain the same as described in the first embodiment. Preferably, each of the flux choking layer sections 76a, 76b has a thickness $t_2$ that is substantially less than PP3 section 49a thickness $t_1$ as defined previously. As a result, back section 76b is formed along a plane that is perpendicular to the ABS while front section 76a has a tapered top surface 76t that is essentially parallel to tapered side 74t where the taper angle formed by the intersection of tapered side 74t with a plane formed parallel to the substrate is between 5 and 60 degrees.

Together, the first write shield 74, flux choking layer 76, and second write shield comprised of PP3 sections 49a, 49b form an integrated trailing shield structure. The integrated trailing shield structure may be comprised of the same magnetic material such as NiFe, CoFe, CoFeNi, or alloys thereof that is employed in the main pole layer 41 and top yoke 42. In an alternative embodiment, one or more of the main pole layer 41, top yoke 42, first write shield 74, flux choking layer 76, and PP3 sections 49a, 49b may be made of a different magnetic material than in the other magnetic layers. For example, the flux choking layer may be comprised of a different magnetic material than in the PP3 sections 49a, 49b.

The advantages of the second embodiment are similar to those described earlier for the first embodiment since both trailing shield structures benefit from a thin flux choking layer that limits the flow of flux from the PP3 trailing shield sections 49a, 49b to the first write shield 74 proximate to the write pole tip 41p.

Referring to FIG. 13, a third embodiment of the present invention is depicted that represents another modification of the PMR writer structure shown in FIG. 3. In particular, the planar flux choking layer 46 in the first embodiment is replaced by a tapered flux choking layer 86 that has a side 86a along the ABS 50-50 with a thickness n in the "y" direction and a side 86b opposite the ABS having a thickness e. Thickness n is from 0.1 to 0.3 microns, e is between 0.2 and 0.5 microns, and e>n. There is a tapered trailing side 86t that extends a distance c from the ABS to a front side of the front PP3 section 49a. PP3 shields sections 49a, 49b have a thickness substantially greater than the thickness e. Preferably, a side of the tapered flux choking layer 86 opposite the tapered trialing side 86t is formed perpendicular to the ABS and contacts a trailing side of the first write shield 44 that is coplanar with the top surfaces of dielectric layer 43 and top yoke 42. The intersection of the tapered trailing side 86t with a plane formed perpendicular to the ABS forms an angle of 5 to 45 degrees which means the angle α between the trailing side and ABS 50-50 is from 45 to 85 degrees. The tapered trailing side 86t may be formed by an ion milling step after the flux choking layer 86 is formed on the first write shield 44 and dielectric layer 43. The third embodiment is designed to provide the same performance benefits as described previously in the first two embodiments with regard to reduced ATE, WATE, and PTP.

In the third embodiment, the first write shield 44, flux choking layer 86, and second write shield comprised of PP3 sections 49a, 49b form an integrated trailing shield structure. The integrated trailing shield structure may be comprised of the same magnetic material such as NiFe, CoFe, CoFeNi, or alloys thereof that is employed in the main pole layer 41 and top yoke 42. In an alternative embodiment, one or more of the main pole layer 41, top yoke 42, first write shield 44, flux choking layer 86, and PP3 sections 49a, 49b may be made of a different magnetic material than in the other magnetic layers. For example, the flux choking layer 86 may be comprised of a different magnetic material than in the PP3 sections 49a, 49b.

The present invention also encompasses a method of making a PMR writer having a trailing shield structure with a flux choking layer as described previously in the three embodiments depicted in FIG. 3, FIG. 12, and FIG. 13. A fabrication sequence according to the present invention is provided in FIGS. 7-11. In the exemplary embodiment, a process flow shows the formation of a PMR writer according to the first embodiment. However, those skilled in the art will recognize that minor adjustments in the process scheme may be used to form a PMR writer according to the second or third embodiment. In particular, an ion milling step may be used to form a tapered side.

Figure 7:
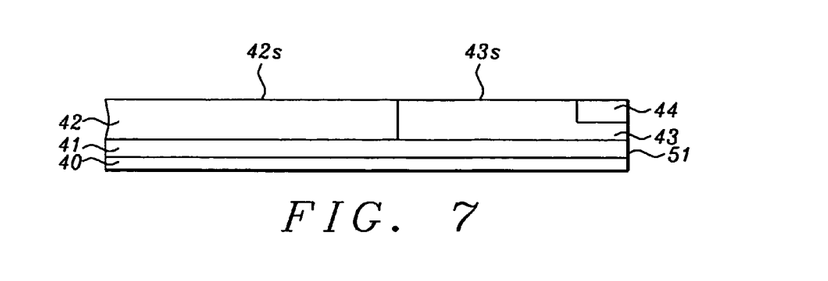
FIGS. 7-11 are cross-sectional views depicting a sequence of steps for fabricating a PMR writer having a flux choking layer along the ABS in a trailing shield structure according to one embodiment of the present invention.

Referring to FIG. 7, a first dielectric layer (not shown) is deposited on the substrate 40 by a physical vapor deposition (PVD) or chemical vapor deposition (CVD) method. An opening (not shown) corresponding to the shape of the main pole layer 41 is formed in the first dielectric layer by conventional photoresist patterning and etching steps. After the patterned photoresist layer is stripped, a seed layer (not shown) may be deposited in the opening. Thereafter, main pole layer 41 may be formed by an electroplating method and is made coplanar with the first dielectric layer by a chemical mechanical polish (CMP) step. The top yoke 42 may be formed in a similar fashion by depositing dielectric layer 43 on the first dielectric layer and main pole layer 41 followed by forming an opening in the dielectric layer corresponding to the desired shape of the top yoke, and then electroplating the top yoke to fill the opening.

The first write shield 44 may be formed by a third photoresist patterning and etch sequence to define an opening in dielectric layer 43 in which the first write shield material is selectively electroplated. The first write shield 44 may have a thickness in the y-axis direction of about 0.1 to 1.5 microns and may be comprised of NiFe, CoFe, CoNiFe, CoFeN, or alloys thereof. Optionally, the openings for the top yoke and first write shield may be defined in dielectric layer 43 by the same photoresist patterning and etching sequence and then filled during the same electroplating process. A second CMP step may be employed to planarize the top yoke 42 and first write shield 44 so the aforementioned layers have top surfaces 42s, 44s, respectively that are coplanar with a top surface 43s of the dielectric layer 43. Top surface 44s is also known as the trailing side of the first write shield 44. Note that the top yoke 42 is recessed a certain distance from an end 51 of the partially formed PMR writer and the dielectric layer 43 includes a write gap section 43g between a trailing side of the main pole layer 41 and a leading side of first write shield 44. In a later step, end 51 will be lapped to form an ABS 50-50 as depicted in FIG. 3.

Figure 8:
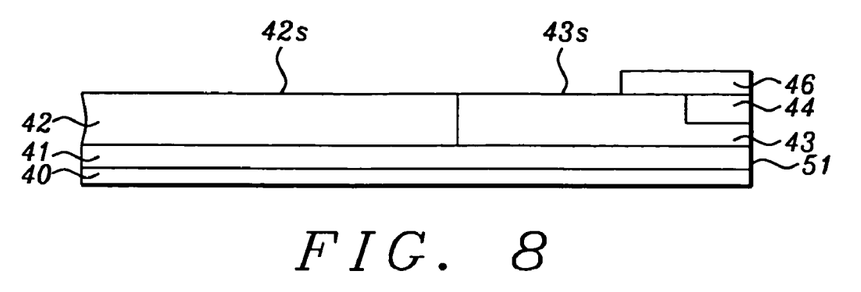

Referring to FIG. 8, the flux choking layer is formed on the top surface 44s of the first write shield 44 and on a portion of top surface 43s. In one embodiment, a photoresist film (not shown) is first deposited and patterned on the top surfaces 42s, 43s, 44s to form an opening corresponding to the shape and size of the flux choking layer 46. Then the flux choking layer 46 may be deposited by a sputter deposition method, for example. Thereafter, a well known lift off process may be employed to remove the photoresist layer. Alternatively, a full film layer of flux choking material such as NiFe, CoFe, CoFeNi, or alloys thereof may be deposited on the top surfaces 42s, 43s, and 44s followed by an ion milling process to remove unwanted portions of the magnetic material and leave a patterned flux choking layer 46 as pictured in FIG. 8.

Figure 9:
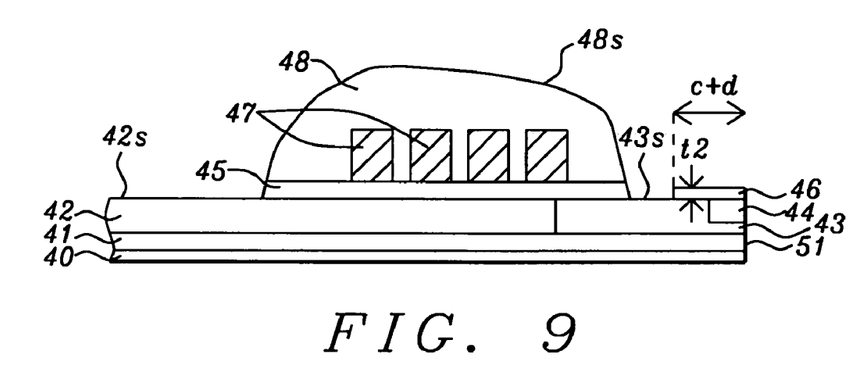

Referring to FIG. 9, the flux choking layer 46 in the partially formed PMR writer has a thickness $t_2$ and extends a distance c+d from the end 51. The distance d represents the length of flux choking layer that will be removed during a subsequent lapping step to form an ABS. The first insulation layer 45 preferably comprised of a dielectric material such as alumina is then formed on the top surfaces 42s, 43s by a photoresist patterning and etch sequence that defines an opening (not shown) in which the first insulation layer is deposited by a PVD or CVD method, for example. After the first insulation layer is planarized and the first photoresist layer is stripped, a second photoresist layer (not shown) is formed and patterned to form openings for the plurality of coils. Thereafter, an electroplating process may be performed to fill the plurality of openings with a conductive metal such as Cu and thereby form coils 47. Then a CMP process is used to form a planar top surface of the coils 47. The second photoresist layer is removed and then a third photoresist is coated on the first insulation layer 45 and over the coils 47. The third photoresist layer is patterned and then reflowed to form a dome shape and represents the second insulation layer 48.

In the exemplary embodiment, the insulation layers 45, 48 form a dome shape having a top surface 48s. Optionally, the stack of insulation layers may have another shape such as a rectangular form with a substantially planar top surface and sides that are substantially perpendicular to the top surfaces 42s, 43s.

Figure 10:
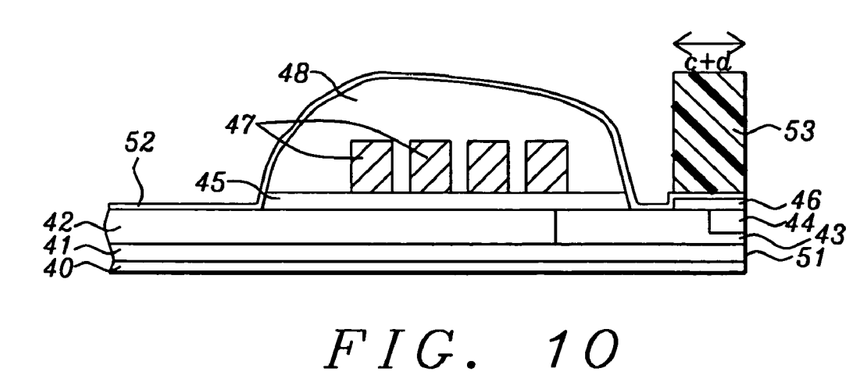

In FIG. 10, a seed layer 52 with a thickness between 0.03 and 0.3 microns is deposited on exposed portions of top surfaces 42s, 43s, on top surface 48s, and on the flux choking layer 46 by a sputter deposition method, for example. The seed layer may be comprised of the same magnetic material that will be subsequently be used for electroplating the PP3 sections 49a, 49b. In another aspect, the seed layer may be made of the same magnetic material as in flux choking layer 46 and that will be used to electroplate PP3 sections 49a, 49b. Next, a photoresist layer 53 is coated and patterned on the seed layer and covers the flux choking layer 46 adjacent to the end 51. Photoresist layer 53 extends a distance c+d in a direction perpendicular to end 51 and is used to prevent electroplating of the PP3 section of the second write shield on the flux choking layer 46 in a subsequent step.

Figure 11:
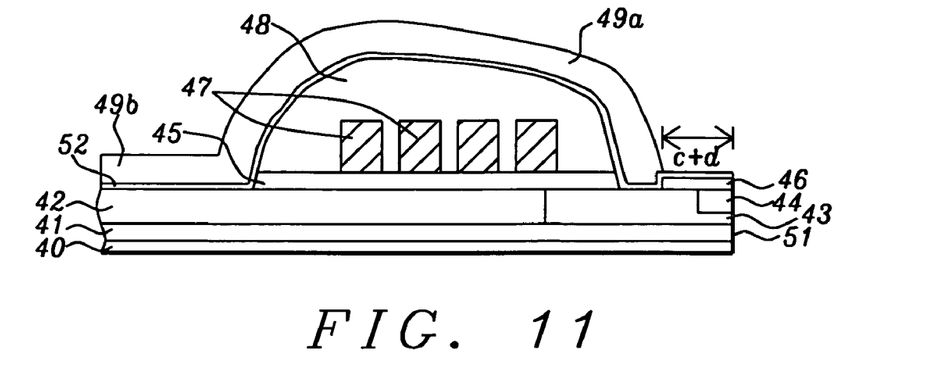

Referring to FIG. 11, the PP3 sections 49a, 49b of the second write shield are electroplated on exposed portions of the seed layer 52 by a well known method and have a substantially uniform thickness $t_1$ as described previously. Note that although seed layer 52 and PP3 sections 49a, 49b are shown as separate layers, the seed layer may be indistinguishable from the PP3 sections when observed as a TEM (transmission electron microscope) cross-section. Thus, the seed layer and PP3 sections may be shown as a single PP3 layer having sections 49a, 49b as depicted in FIG. 3. Likewise, the seed layer 52 and flux choking layer 46 may be comprised of the same magnetic material and may be alternatively shown as a single layer as depicted in FIG. 3. After electroplating, a seed milling operation is performed to remove unwanted seed layer in regions outside the device area. Finally, the photoresist layer 53 is stripped by a standard process.

Thereafter, an overcoat layer made of a dielectric material may be deposited on the PP3 sections 49a, 49b, and over the flux choking layer 46. In addition, a lapping process is performed to form an ABS 50-50 as shown in FIG. 3 where the flux choking layer extends a distance c in a direction perpendicular to the ABS.

In an alternative embodiment (not shown), the flux choking layer deposition step in FIG. 9 may be omitted. In that case, the seed layer 52 deposited in FIG. 10 serves as the flux choking layer and contacts a trailing side of the first write shield 44 and a top surface of dielectric layer 43 between the ABS and a front side of the PP3 section 49a. In this embodiment, the seed layer has a thickness from 0.1 to 0.3 microns.

An important advantage according to the present invention is that the PMR write head having a PP3 trailing shield section with a flux choking layer adjacent to the ABS retains the on-track performance of prior art writers while providing an improvement in reducing ATE and WATE during multiple write processes because of a substantially lower magnetic flux from the integrated trailing shield at the ABS proximate to the write pole tip. Moreover, pole tip protrusion is controlled to a greater extent than in prior art designs since there is less magnetic material in the trailing shield section proximate to the ABS thereby lowering the amount of thermal expansion generated for a given amount of temperature increase. Therefore, overall write head performance is increased because the advantages mentioned above are achieved without compromising other magnetic properties. The present invention also encompasses a design wherein the PP3 trailing shield sections are comprised of two different magnetic layers as described in related application Ser. No. 12/157,683 to further improve the PMR writer performance.

While this invention has been particularly shown and described with reference to, the preferred embodiment thereof, it will be understood by those skilled in the art that various changes in form and details may be made without departing from the spirit and scope of this invention.

We claim:

1. A PMR write head formed on a substrate and having at least a trailing shield, comprising:
    (a) a main pole layer formed on the substrate and having a write pole tip at an air bearing surface (ABS);
    (b) a dielectric layer formed on the main pole layer and comprising a write gap contacting a trailing side of the main pole layer at the write pole tip;
    (c) a first write shield contacting a side of the write gap opposite the main pole layer and having a trailing side that is coplanar with a top surface of said dielectric layer and is formed perpendicular to the ABS;
    (d) a flux choking layer formed on the trailing side of the first write shield and on a portion of the top surface of the dielectric layer adjacent to the first write shield, said flux choking layer has a uniform first thickness in a down-track direction and extends from the ABS to a front side of a PP3 section of a trailing shield structure wherein the PP3 section has a second thickness substantially greater than said first thickness and the PP3 section, flux choking magnetic layer, and first write shield form an integrated trailing shield structure.

2. The PMR write head of claim 1 wherein the first thickness is from about 0.1 to 0.3 microns and the second thickness is between about 0.3 and 1.0 microns.

3. The PMR write head of claim 1 wherein said flux choking layer extends a distance of about 0.1 to 2 microns from the ABS to the front side of the PP3 section.

4. The PMR write head of claim 1 wherein the flux choking layer is comprised of CoFe, NiFe, CoFeNi, or alloys thereof.

5. The PMR write head of claim 1 wherein the integrated trailing shield and main pole layer are made of the same magnetic material.

6. A PMR write head formed on a substrate and having at least a trailing shield, comprising:
    (a) a main pole layer formed on the substrate and having a write pole tip at an air bearing surface (ABS);
    (b) a dielectric layer formed on the main pole layer and comprising a write gap contacting a trailing side of the main pole layer at the write pole tip;
    (c) a first write shield contacting a side of the write gap opposite the main pole layer and having a tapered trailing side formed at a taper angle with respect to a plane perpendicular to the ABS such that a side along the ABS has a smaller thickness in a down-track direction than a side opposite the ABS; and
    (d) a flux choking layer formed on the tapered trailing side of the first write shield and on a portion of the dielectric layer adjacent to the first write shield, said flux choking layer has a uniform first thickness and comprises:
        (1) a front section contacting the trailing tapered side of the first write shield and having a trailing tapered side formed essentially parallel to the trailing tapered side of the first write shield, a side along the ABS, and a side opposite the ABS that contacts a front side of a back section of the flux choking layer; and
        (2) the back section having a front side contacting the front section and a back side contacting a front side of a PP3 section of a trailing shield structure wherein the PP3 section has a second thickness substantially greater than said first thickness and the PP3 section, flux choking magnetic layer, and first write shield form an integrated trailing shield structure.

7. The PMR write head of claim 6 wherein the first thickness is from about 0.1 to 0.3 microns and the second thickness is between about 0.3 and 1.0 microns.

8. The PMR write head of claim 6 wherein the front section of said flux choking layer extends a distance of about 0.05 to 0.3 microns from the ABS to the front side of the back section.

9. The PMR write head of claim 6 wherein the flux choking layer is comprised of CoFe, NiFe, CoFeNi, or alloys thereof.

10. The PMR write head of claim 6 wherein the taper angle is between about 5 and 60 degrees.

11. The PMR write head of claim 6 wherein the integrated trailing shield and main pole layer are made of the same magnetic material.

12. A PMR write head formed on a substrate and having at least a trailing shield, comprising:
    (a) a main pole layer formed on the substrate and having a write pole tip at an air bearing surface (ABS);
    (b) a dielectric layer formed on the main pole layer and comprising a write gap contacting a trailing side of the main pole layer at the write pole tip;
    (c) a first write shield contacting a side of the write gap opposite the main pole layer and having a trailing side that is coplanar with said dielectric layer and formed perpendicular to the ABS; and
    (d) a flux choking layer formed on the trailing side of the first write shield and on a portion of the dielectric layer adjacent to the first write shield, said flux choking layer has a tapered trailing side, a side along the ABS with a first thickness, and a side opposite the ABS with a second thickness greater than said first thickness in a down-track direction, said flux choking layer extends from the ABS to a front side of a PP3 section of a trailing shield structure wherein the PP3 section has a thickness substantially greater than said second thickness and the PP3 section, flux choking layer, and first write shield form an integrated trailing shield structure.

13. The PMR write head of claim 12 wherein the first thickness is from about 0.1 to 0.3 microns and the second thickness is between about 0.2 and 0.5 microns.

14. The PMR write head of claim 12 wherein the tapered trailing side intersects a plane perpendicular to the ABS to form a taper angle of about 5 to 45 degrees.

15. The PMR write head of claim 12 wherein the flux choking layer extends a distance of about 0.1 to 2 microns from the ABS to the front side of the PP3 section of the trailing shield.

16. The PMR write head of claim 12 wherein the flux choking layer is comprised of CoFe, NiFe, CoFeNi, or alloys thereof.

17. The PMR write head of claim 12 wherein the integrated trailing shield is comprised of the same magnetic material as in the main pole layer.

18. A method of forming a PMR write head having at least a trailing shield structure with a flux choking layer formed adjacent to an air bearing surface (ABS), comprising:
   (a) forming a main pole layer on a substrate wherein the main pole layer has a write pole tip at an ABS;
   (b) forming a dielectric layer having a top surface formed opposite said main pole layer and comprised of a write gap on said main pole layer, said write gap is formed along the ABS and contacts a trailing side of the main pole layer;
   (c) forming a first write shield on the write gap along the ABS and having a trailing side that connects to the top surface of the dielectric layer;
   (d) forming a flux choking layer on the trailing side of the first write shield and on a portion of the dielectric layer proximate to the connection with the first write shield, said flux choking layer has a first thickness and extends a certain distance from the ABS toward a back end of the PMR writer; and
   (e) forming a PP3 section of a second shield above the dielectric layer such that a front side of the PP3 section contacts a back side of the flux choking layer to form an integrated trailing shield structure including the PP3 section, flux choking layer, and first write shield, said PP3 section has a second thickness substantially greater than said first thickness.

19. The method of claim 18 wherein the trailing side of the first write shield is tapered with respect to the ABS, a front section of the flux choking layer on the trailing side of the first write shield is tapered, and a back section of the flux choking layer formed on the first dielectric layer is formed along a plane perpendicular to the ABS.

20. The method of claim 18 wherein the flux choking layer extends a distance of about 0.1 to 2 microns from the ABS toward a back end of the PMR writer.

21. The method of claim 18 further comprised of forming one or more insulation layers on the dielectric layer and forming a plurality of coils in the one or more insulation layers before the PP3 section of the second write shield is fabricated.

22. The method of claim 18 wherein the flux choking layer is made of NiFe, CoFe, CoFeNi, or alloys thereof.

23. The method of claim 18 wherein the first thickness is between about 0.1 and 0.3 microns and the second thickness is from about 0.3 to 1.0 microns.

24. The method of claim 18 wherein the trailing side of the first write shield is formed perpendicular to the ABS and the flux choking layer has a uniform thickness in a down-track direction with a trailing side that is formed perpendicular to the ABS.

25. The method of claim 18 wherein the trailing side of the first write shield is formed perpendicular to the ABS and the flux choking layer has a trailing side that is tapered with respect to the ABS such that a side of the flux choking layer along the ABS has a smaller thickness in a down-track direction than a side opposite the ABS.

* * * * *